Patented July 26, 1949

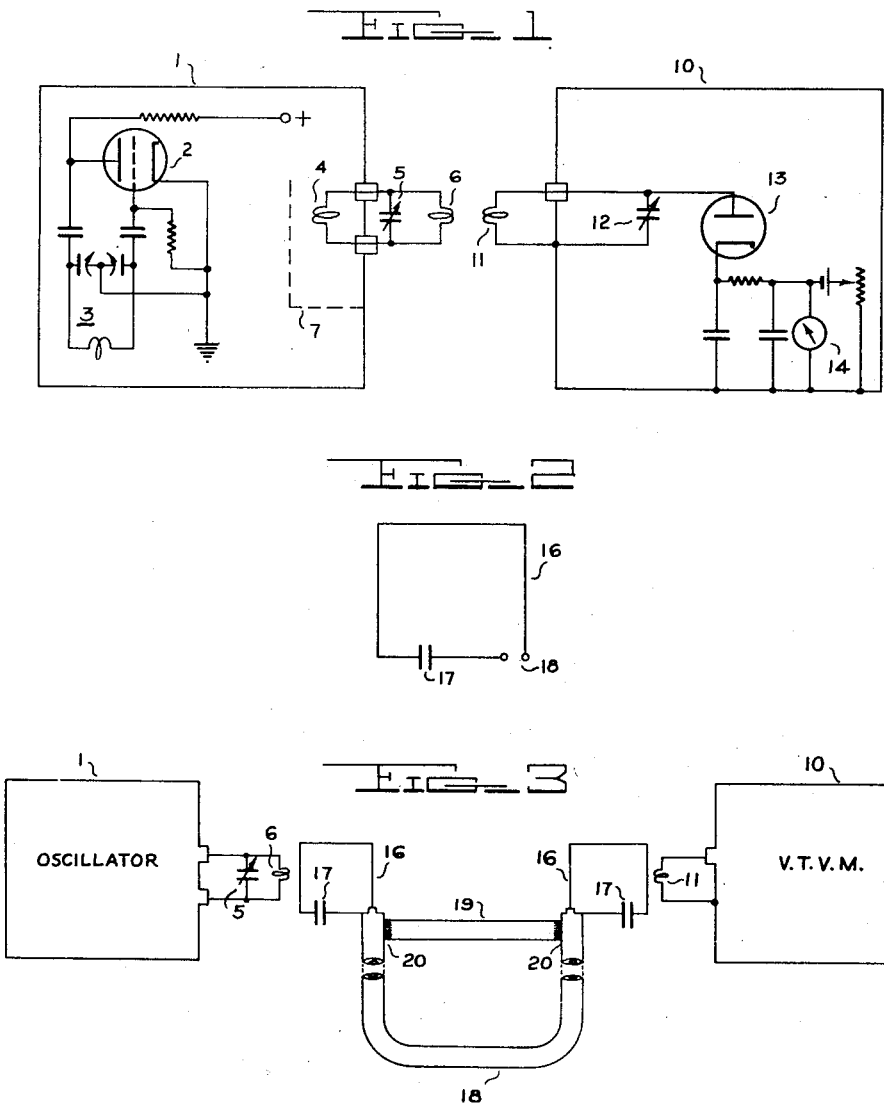

2,476,992

UNITED STATES PATENT OFFICE 2,476,992

METHOD AND MEANS FOR DETERMINING TRANSMISSION LINE ATTENUATION

John M. Miller, Washington, D. C.

Application June 20, 1944, Serial No. 541,255

5 Claims. (Cl. 175—183)

(Granted under the act of March 3, 1883, as amended April 30, 1928; 370 O. G. 757)

This invention relates to the measurement of the attenuation loss in transmission lines.

It is a primary object of the invention to provide a novel method of attenuation measurement applicable to the quick determination of attenuation in transmission line sections without ascertaining the characteristic impedance of the transmission line.

It is a further object of the invention to provide means for measuring transmission line attenuation.

The measurement of transmission line power loss requires that the line be properly terminated in its characteristic impedance so as to avoid reflection from the end of the line. Unless this condition is established, false values will be obtained due to the power consumed in the cable from the reflected wave. A salient advantage of the method of the present invention lies in the fact that characteristic impedance of the line is matched without the necessity of ascertaining its value.

The method of the present invention also automatically establishes a correct impedance match between the power source and the input of the line so that the determination of the input power level is not complicated by reflection factors.

The invention will be further described in connection with the drawings, in which Fig. 1 shows apparatus components arranged for one step of the method;

Fig. 2 shows a line terminating loop;

Fig. 3 shows apparatus components arranged for another step in the process.

The line attenuation is determined by comparing the power delivered by the line to a matching load with the input power fed to the cable. This determination is made by critically coupling a tuned vacuum tube voltmeter to a source of fixed power, coupling the same components through the cable, again with critical coupling, and comparing the voltage readings.

As shown in Fig. 1, the power source comprises an oscillator contained in shielded compartment 1 including triode 2 provided with tank circuit 3. This oscillator is conventional, and any generator of the desired frequency may be employed. A link coupling circuit is used, comprising turn 4 within compartment 1 very loosely coupled to the oscillator, and condenser 5 with inductance 6 mounted exteriorly. In order to establish a very low coupling, shield 7 is placed within the compartment partly surrounding turn 4 of the link circuit. By condenser 5, the link is tuned to the oscillator frequency. Under these conditions, the coupling circuit can be considered as being driven by a constant series E. M. F.

In what may be viewed logically as the first step of the process, the voltmeter is adjusted to critical coupling with the link circuit. The voltmeter, as is also shown in Fig. 1, is shielded in compartment 10, provided with exterior pickup coil 11 tuned with condenser 12 mounted within the structure. The voltage developed across the tuned voltmeter circuit is rectified across diode 13 and the current measured by microammeter 14.

Manifestly the oscillator and voltmeter will be designed for operation at the frequency for which attenuation measurements are to be made. It is convenient to calibrate the oscillator directly in frequency, although a sensitive wavemeter may be employed in case precise frequency measurements are required. Voltmeter calibration may be effected by breaking the connection between the diode anode and the tuned circuit and applying known low frequency voltages which are correlated with readings of a microammeter 14. Before use, the voltmeter will be tuned to the oscillator frequency at very loose coupling to link 6.

For obtaining an indication of the power available, the position of the voltmeter is adjusted for maximum reading. This occurs at critical coupling, and under these conditions the maximum power output from the link circuit is obtained, each circuit having coupled thereinto a resistance equal to its own, and equal power being dissipated in both.

The power delivered by the link circuit is then $$\frac{E_1^2}{R}$$

where $E_1$ is the voltage developed, and $R$ is the total effective resistance of the tuned voltmeter circuit. However, determination of $R$ is not required, as will appear below.

The attenuation of the line section is determined as indicated in Fig. 3. In this arrangement the line is terminated in non-reactive loops shown in Fig. 2. These loops comprise coil 16, which may be a single turn at high frequency, in series with capacity 17. Such loops are tuned to the desired frequency of measurement, the frequency of the loop being adjusted after temporarily joining terminals 18. Such loops are connected across both ends of the line section, and provide a non-reactive termination of the line.

The line section, terminated in the non-reactive loops, is coupled between the oscillator link circuit and the voltmeter. In Fig. 3 a coaxial line section 18 is employed. In order to avoid circulating currents on the outer conductor, the ends of the latter are shorted by bar 19 to which they are soldered at 20. All components should be grounded, preferably to a conducting plate supporting the apparatus.

The coupling between the link coupling coil and the input loop of the line, and the coupling between the output loop of the line and the tuned voltmeter circuit, are individually adjusted to the the critical value. This is accomplished by successively adjusting each coupling for maximum voltmeter reading, the steps being repeated until optimum conditions are obtained.

Under critical coupling between the oscillator link circuit and the input loop, maximum power output is delivered from the oscillator, this being the same amount of power which was delivered to the voltmeter in the first described step of the process.

This coupling also matches the input impedance of the line, as it couples into the input loop the characteristic impedance of the line.

Similarly, the coupling conditions between the output loop and the tuned voltmeter circuit couples the characteristic impedance into the terminating loop, establishing a complete match of the line and eliminating all standing waves.

The power received by the voltmeter circuit is now $$E_2^2/R$$

Where $E_2$ is the voltmeter reading and $R$ is the total effective resistance of the voltmeter tuned circuit. $R$, however, has the same value as in the first step of the method, twice the resistance of the tuned voltmeter circuit alone. Consequently the ratio of the input to the output power is:

$$\frac{E_1^2}{E_2^2}$$

and the attenuation of the line is:

$$A = 20 \log_{10} \frac{E_1}{E_2}$$

Manifestly the order of the steps described is not material, inasmuch as $E_2$ may be determined previously to $E_1$. Further, it will be understood that the practice of the method is not dependent upon the specific apparatus components disclosed, which have been selected as illustrative only.

The invention described herein may be manufactured and used by or for the Government of the United States of America for governmental purposes without the payment of any royalties thereon or therefor.

I claim:

1. A method of determining the attenuation of a line terminated in non-reactive coupling loops with a source of alternating power having a loosely coupled link circuit, and a tuned circuit, including loosely coupling the link circuit to the source of alternating power, coupling the tuned circuit to the link circuit, adjusting the coupling to obtain critical coupling, measuring the voltage developed in the tuned circuit, coupling the line terminated in non-reactive loops between the link circuit and the tuned circuit, adjusting the line couplings to obtain critical coupling, and measuring the voltage developed in the tuned circuit.

2. The method of determining the attenuation of a line terminated in non-reactive loops with a constant alternating voltage generator and a tuned circuit, including coupling the tuned circuit to the constant voltage generator, adjusting the coupling to obtain critical coupling, measuring the voltage developed across the tuned circuit, coupling the line terminated in non-reactive loops between the generator and the tuned circuit, and adjusting the line couplings to obtain critical coupling, and measuring the voltage developed in the tuned circuit.

3. In combination, a source of alternating power, a link circuit loosely coupled thereto, a transmission line section terminated in coupling loops non-reactive at the alternating power frequency, an output circuit, comprising power level indicating means, adjustably couplable alternatively to the link circuit for critical coupling and to one coupling loop for critical coupling, said other coupling loop being adjustably couplable to the link circuit for critical coupling.

4. In combination, a source of alternating power, a link circuit loosely coupled thereto, a transmission line section terminated at each end in adjustable coupling means, an output circuit comprising power level indicating means adjustably couplable alternatively to the link circuit for critical coupling and to one coupling means for critical coupling, the other coupling means being adjustably couplable to the link circuit for critical coupling.

5. In combination, a source of constant alternating power independent of its load conditions, a transmission line section terminated at each end in adjustable coupling means, an output circuit comprising power level indicating means adjustably couplable alternatively to the power source for critical coupling and to one coupling means for critical coupling, the other coupling means being adjustably couplable to the power source for critical coupling.

JOHN M. MILLER.

REFERENCES CITED

The following references are of record in the file of this patent:

UNITED STATES PATENTS

| Number | Name | Date |
|---|---|---|
| 1,816,958 | Clark et al. | Aug. 4, 1931 |
| 1,831,921 | Martin | Nov. 17, 1931 |
| 1,895,111 | Suydam | Jan. 24, 1933 |
| 1,920,456 | Adler | Aug. 1, 1933 |
| 2,115,377 | Weyers | Apr. 26, 1938 |
| 2,374,652 | Cohen | May 1, 1945 |
| 2,380,791 | Rosencrans | July 31, 1945 |
| 2,419,613 | Webber | Apr. 29, 1947 |

OTHER REFERENCES

Race: General Electric Review, September 1941, pages 507–510.